United States Patent
Verkin et al.

(10) Patent No.: US 10,293,786 B1
(45) Date of Patent: *May 21, 2019

(54) METHOD AND SYSTEM FOR SECURE ACCESS TO A VEHICLE

(71) Applicant: VOLKSWAGEN AG, Wolfsburg (DE)

(72) Inventors: Julian Verkin, Hennigsdorf (DE); Patrick Sammer, Berlin (DE); Karsten Beyer, Berlin (DE)

(73) Assignee: Volkswagen AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,331

(22) Filed: Jan. 4, 2019

Related U.S. Application Data

(63) Continuation of application No. 15/588,750, filed on May 8, 2017, now Pat. No. 10,183,650.

(30) Foreign Application Priority Data

May 10, 2016 (DE) .................. 10 2016 207 997

(51) Int. Cl.
  *G01D 5/20* (2006.01)
  *B60R 25/24* (2013.01)
(52) U.S. Cl.
  CPC .............. *B60R 25/24* (2013.01); *G01D 5/20* (2013.01)
(58) Field of Classification Search
  CPC combination set(s) only.
  See application file for complete search history.

(56) References Cited

U.S. PATENT DOCUMENTS

| 4,743,913 A | 5/1988 | Takai |
| 9,782,669 B1 | 10/2017 | Hill |

FOREIGN PATENT DOCUMENTS

| DE | 4123654 A1 | 1/1993 |
| DE | 19900415 A1 | 7/2000 |
| DE | 10046571 A1 | 5/2002 |
| DE | 102010017493 A1 | 12/2011 |
| DE | 102010054593 A1 | 12/2011 |
| DE | 102014102271 A1 | 9/2014 |
| DE | 102015109468 A1 | 12/2016 |

OTHER PUBLICATIONS

Search Report for German Patent Application No. 10 2016 207 997.2; dated Jan. 18, 2017.

*Primary Examiner* — Nabil H Syed
*Assistant Examiner* — Cal J Eustaquio
(74) *Attorney, Agent, or Firm* — Barnes & Thornburg LLP

(57) ABSTRACT

A method for assessing a reliability of a determination of the relative position between a device for accessing a vehicle and the vehicle including transmitting a first radio signal from a first antenna of the vehicle; transmitting a second radio signal from a second antenna of the vehicle; receiving the first radio signal at the device and determining a first signal intensity; receiving the second radio signal at the device and determining a second signal intensity; determining, at the device or the vehicle, a relative position of the device and/or the vehicle and/or signal directions from which the radio signals have arrived at the device, based on the first signal intensity and the second signal intensity; determining a compatibility of the determined relative position and/or the signal directions with an arrangement of the first antenna and the second antenna at the vehicle to assess the reliability of relative position determination.

14 Claims, 2 Drawing Sheets

METHOD AND SYSTEM FOR SECURE ACCESS TO A VEHICLE

CROSS REFERENCE TO RELATED APPLICATIONS

This patent application is a continuation of co-pending U.S. patent application Ser. No. 15/588,750, filed 8 May 2017, entitled METHOD AND SYSTEM FOR SECURE ACCESS TO A VEHICLE, which claims priority to German Patent Application No. 10 2016 207 997.2, filed 10 May 2016, the disclosures of which are incorporated herein by reference in their entireties.

SUMMARY

Illustrative embodiments relate to a method for assessing a reliability of a determination of the relative position between a device for accessing a vehicle and the vehicle, a method for allowing or denying access to a vehicle, and a system for allowing or denying access to a vehicle.

BRIEF DESCRIPTION OF THE DRAWINGS

Disclosed embodiments will now be explained with reference to the attached drawings.

DETAILED DESCRIPTION

Figure 1:
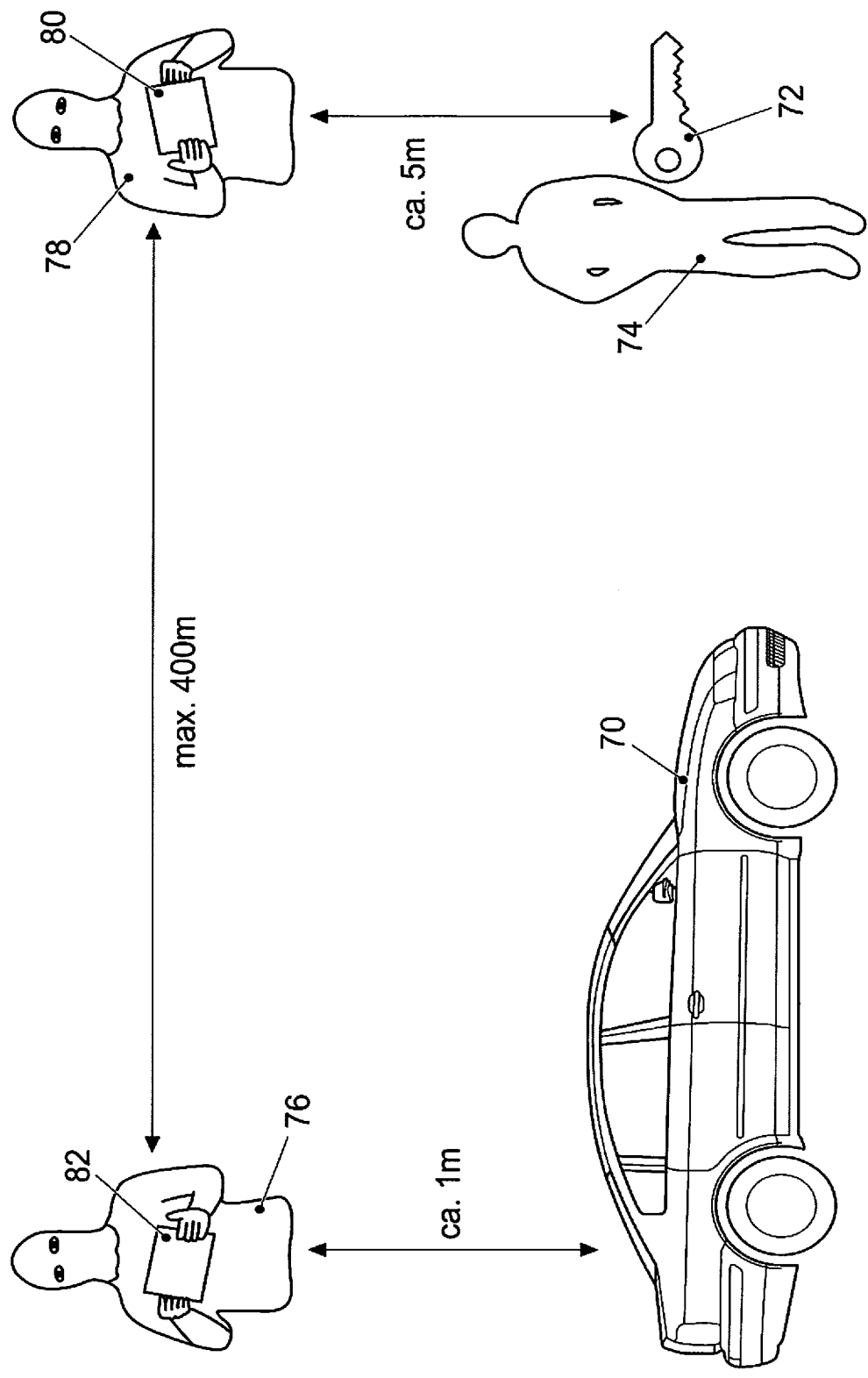
FIG. 1 illustrates a schematic view of a relay attack using a keyless entry system according to the related art.

DE 41 23 654 A1 discloses a method for detecting a portable transponder enclosed in the vehicle interior for keyless access to the vehicle, wherein the position of the transponder is detected and a signal is triggered, wherein locking is carried out only if the transponder is detected outside the vehicle. Information about the position of the transponder is obtained from the field strength distribution of the transponder. In addition to determining the position of the transponder, a movement tendency of the transponder may also be detected from the field strength changes and from the field strength change distribution of code signals which are transmitted in succession by the transponder.

DE 199 00 415 B4 discloses a method for carrying out a keyless security entry control method for motor vehicles, wherein a transceiver device and an identification transmitter are provided in the motor vehicle. The instantaneous position of the identification transmitter is determined, namely, via the identification transmitter itself. Furthermore, a plausibility check with respect to the action signal received by the identification transmitter is carried out as a function of its previously determined position. To open the vehicle, the person carrying the ID transmitter actuates the door handle on the driver's door, whereupon the request to unlock the door is conveyed via a toggle switch to the transceiver device, whereupon the transceiver device responds with the start of a query-response dialog. Wake-up signals are transmitted via LF transmitters for activating ID transmitters situated in the reception range of these LF transmitters. Subsequently, location-coded LF signals are transmitted via the LF transmitters. Furthermore, a determination of the position of the ID transmitters situated in the reception range of the LF transmitters is carried out.

Keyless entry systems in vehicles may be susceptible to so-called relay attacks, in which the distance between the vehicle and the radio key is bridged by two transceiver units in such a way that opening and starting the vehicle is possible even if the key is actually outside the range, as described in the magazine c't, no. 26/2015. To detect or impede relay attacks, various approaches are followed in the related art. Initially, measures for securing the frequency bands (generally LF and UHF) used for the radio communication, for example, RSSI measurements and amplitude hopping, were carried out. Furthermore, measurements via additional use of other frequency bands, for example, UWB with time-of-flight (ToF) measurement and phase difference measurement, were carried out. Furthermore, measurements independent of radio technology, for example, checking the geographical proximity between the key and the vehicle via GPS (Global Positioning System), were carried out.

However, the conventionally known methods and measures are for the most part very elaborate, complex and costly. The effectiveness of some of the known methods may also be reduced or even rendered completely inoperable by unauthorized persons such as thieves. Furthermore, known methods may be subject to location-dependent limitations (for example, GPS inside parking garages).

Disclosed embodiments describe and provide a method for assessing a reliability of a determination of the relative position between a device for accessing a vehicle and the vehicle, a method for allowing or denying access to a vehicle, and a system for allowing or denying access to a vehicle, wherein at least some of the drawbacks arising in the related art are overcome. Disclosed embodiments provide a method and a system which impede or even completely prevent access to a vehicle by unauthorized persons.

According to at least one disclosed embodiment, a method for assessing a reliability of a determination of the relative position between a device for accessing a vehicle and the vehicle. The method refers to transmission of a first radio signal from a first antenna of the vehicle; transmission of a second radio signal from a second antenna of the vehicle; reception of the first radio signal at the device and determination of a first signal intensity; reception of the second radio signal at the device and determination of a second signal intensity; determination, at the device or the vehicle, of a relative position of the device and the vehicle and of signal directions from which the radio signals have arrived at the device, based on the first signal intensity and the second signal intensity; determination of a compatibility of the determined relative position and the signal directions with an arrangement of the first antenna and the second antenna on the vehicle, to assess the reliability of the relative position determination.

The method may, for example, be carried out by a device inside the vehicle and by a mobile device, for instance, a mobile electronic key. Disclosed embodiments may improve keyless access to a vehicle. For example, if a hand of an authorized driver comes within a certain distance of a door handle of a vehicle equipped with a keyless entry system, the corresponding system is activated from a sleep mode. Furthermore, an encoded query signal at a LF frequency of, for example, 125 or 130 kHz may be transmitted via one or multiple antennas distributed on or in the vehicle. Thereupon, the system may switch to a reception mode in the UHF range (for example, 433 MHz or 868 MHz for Europe, or 315 MHz for Japan and the USA), and wait for a confirmation. If the device, i.e., the electronic key which may be configured as an RFID transponder, is in a range (of several meters), it receives the LF query signal, may decode it, and may retransmit it in the UHF frequency band having new encoding. This signal transmitted by the electronic key may be decoded again in the vehicle. In this case, the system inside the vehicle may know both the encoding table of the electronic key and its own encoding table, and may thus compare its own original transmission to the signal just received. If there is no correct response within a defined period, the system may switch again to a waiting mode. If the two codes match, the system may effectuate an authorization, whereby the system may release the lock of the vehicle. The door can thus be opened by pulling on the handle.

To impede or even prevent a possible relay attack by unauthorized persons, a first radio signal and a second radio signal are transmitted respectively by the first antenna and the second antenna (arranged in another area) of the vehicle. The two signals are received by the device, and a respective signal intensity is determined. The first radio signal may have been transmitted at a known, original first signal intensity, and the second radio signal may have been transmitted at a known, original second signal intensity. In the case of a known, original first signal intensity and a known, original second signal intensity, a determination of the first signal intensity and the second signal intensity of the radio signals received at the device provides inferences about the distance between the first antenna of the vehicle and the device, and inferences about the distance between the second antenna of the vehicle and the device. Furthermore, additional radio signals may optionally be transmitted by the vehicle from other antennas, and received by the device, and their signal intensities may also be determined. A position of the device relative to the vehicle (described, for example, in a coordinate system which is fixedly related to the vehicle) may thereby be determined.

The device may furthermore comprise an antenna or an antenna system having multiple antenna sections, the antenna system being able to allow the determination of a direction from which a specific radio signal has been received. For example, for this purpose, a so-called 3D antenna may be used, which may comprise two or three or even more antenna sections which are oriented in different directions which, for example, are perpendicular to one another. Signal intensities which are determined by the various antenna sections may provide information about the direction from which the relevant radio signal was received.

The device and/or the vehicle may also have information about the arrangement of the first antenna and the second antenna (and other antennas) on the vehicle. After the relative position and the signal directions from which the radio signals have arrived at the device have been determined, a plausibility check of the relative position and the signal directions may be carried out by checking whether the determined relative position and the signal directions are consistent, i.e., compatible, with the known arrangement of the antennas. The compatibility may be characterized by a quantitative variable. The compatibility may, for example, be characterized by specific categories, for example, high compatibility, average compatibility, or low compatibility. The reliability may also be characterized by a number or class or category which represents the degree of reliability. Thus, a plausibility check of the relative position of the device relative to the vehicle may be carried out, and may be used to ensure controlled access to the vehicle.

The device may comprise an antenna having at least two antenna sections oriented along two directions, the antenna being configured to determine the signal strength components of received signals associated with the two directions. The device may comprise an antenna with three antenna sections oriented along three directions, to be configured to be able to determine the direction of a radio signal when one is received. Thus, the method may be implemented via conventionally available antennas, for example, a 3D antenna.

The method may furthermore comprise transmission of a third radio signal from a third antenna of the vehicle, and reception of the third radio signal at the device and determination of a third signal intensity. Additional radio signals which are transmitted from additional antennas of the vehicle, or additional radio signals which are repeatedly transmitted by identical antennas, may be received at the device. The accuracy of a relative position determination may be increased by receiving and evaluating more radio signals from more antennas. A signal intensity of a radio signal may decrease with a specific characteristic curve, as a function of the distance from the transmitting antenna, for example, quadratically with the distance. It is possible to infer the distance between the transmitting antenna and the position of the device from a ratio of the original signal intensity (at the transmitting antenna) and the signal intensity which was received at the device. In the case of three transmitting antennas which transmit three (different or identical) radio signals, the position of the device relative to the vehicle may be obtained via the intersection of three spheres, each having the relevant transmitting antenna in the center, and having a radius which is determined as a function of the received signal intensity and/or the original signal intensity. Furthermore, the orientation of the device (for example, relative to the vehicle) may be defined by determining the directions of the radio signals. However, a determined relative position and determined directions or orientation may not always, for example, in the case of a relay attack, consistent with the known arrangement of the antennas from which the radio signals have been transmitted. If an inconsistency is determined, the compatibility of the determined relative position and the signal directions with the known antenna arrangement is classified as low, or a correspondingly low numerical value is assigned. Thus, the reliability of the relative position determination is also assessed as low. However, if a consistency between the position, the signal directions, and the antenna arrangement is ascertained, a high compatibility may be determined, and the reliability of the relative position determination may thus be assessed as high.

The method may furthermore comprise a measurement of the terrestrial magnetic field direction at the vehicle, for example, via a sensor inside the vehicle. Furthermore, a terrestrial magnetic field direction may also be measured at the device (using a sensor which is incorporated into the device). Furthermore, the terrestrial magnetic field direction at the vehicle (the one which was measured at the vehicle) may be compared with the one at the device, for instance, the one which was measured at the device, to further assess the reliability of the relative position determination. At a specific relative position and orientation (from the specific signal directions) of the device relative to the vehicle which are correct, a particular terrestrial magnetic field direction is expected at the device which is consistent with, in particular is parallel to, the terrestrial magnetic field direction at the vehicle. However, if the device determines a terrestrial magnetic field direction which, for example, is not (or is not essentially) parallel to the terrestrial magnetic field direction determined by the vehicle, this may be an indication that either the determination of the relative position and/or an orientation of the device is not reliable or has only a certain degree of reliability. An assessment of the reliability of the relative position determination may thereby be further improved.

The method may furthermore comprise determination of a compatibility of the particular terrestrial magnetic field directions at the vehicle and at the device via the arrangement at least of the first antenna and the second antenna at the vehicle, to further determine the reliability of the determination of the relative position and/or a particular relative orientation between the device and the vehicle. The method may thereby be further improved.

The method may furthermore comprise a generation of an additional magnetic field at the vehicle (for instance, by activating coils of an electric motor, such as supplying the coil with direct current), to obtain a total magnetic field which is not only detectable inside the vehicle, but also radiates or is perceptible or detectable in an immediate vicinity of the vehicle. The total magnetic field can be measured at the device, i.e., the magnetic field direction (and optionally also the intensity) of the total magnetic field can be measured at the location of the device. Furthermore, the measured total magnetic field at the device may be compared to an expected total magnetic field at the device according to the generated additional magnetic field, the determined relative position and/or relative orientation, to continue to assess the reliability of the determination of the relative position and/or a determined relative orientation between the device and the vehicle.

A brief magnetic field disturbance of the otherwise constant terrestrial magnetic field may be caused by activating a magnetic field-generating device inside the vehicle. The total magnetic field and/or the change in the magnetic field may be detected at the device with respect to its direction and/or strength, and may furthermore be used for assessing the reliability of the relative position determination.

The method may furthermore comprise a wireless transmission of measurement data, which relate to the signal intensities and/or signal directions and/or magnetic fields, from the device to the vehicle. An evaluation of these measurement data with respect to the relative position determination and/or orientation determination and/or signal direction determination and/or assessment of the reliability of the relative position determination may be carried out at the vehicle (in a corresponding control unit or in a processing unit). As a result, the complexity of the device and the energy consumption of the device may be reduced. The device does not have to allow any extraordinary processing processes and may thus be configured and provided in a simple, economical manner.

It should be understood that features which have been mentioned, provided, described, or explained individually or in any combination in connection with a method for assessing a reliability of a determination of the relative position, may also be used individually or in any combination on a method for allowing or denying access to a vehicle, and also on a system for allowing or denying access to a vehicle, according to disclosed embodiments.

According to another disclosed embodiment, a method is provided for allowing or denying access to a vehicle. In this case, the method comprises arranging a device for accessing the vehicle with respect to the vehicle; carrying out a method for assessing a reliability of a determination of the relative position between the device and the vehicle according to one of the preceding disclosed embodiments; depending on the degree of reliability: allowing or denying access to the vehicle, wherein allowing the access comprises opening a lock of a vehicle door and/or starting an engine of the vehicle.

Thus, access to a vehicle may be made possible only for authorized persons; the effects of relay attacks may be limited.

According to at least one disclosed embodiment, a system for allowing or denying access to a vehicle is provided. The system comprises the vehicle and a device for accessing the vehicle, wherein the system is configured to carry out the method for allowing or denying access to the vehicle according to an above-described embodiment.

FIG. 1 illustrates a vehicle 70 which may be opened using an electronic key 72 of an authorized person 74 (adapted from c't, no. 26/2015). The key 72 is an electronic key which can grant access to the vehicle 70 according to a conventional keyless entry system, wherein the key, for example, can trigger a lock of a door of the vehicle 70 to open. Inside the conventional keyless entry system, an arrangement of the key 72 near the vehicle, for example, within a distance of 1 m, is required to open a door of the vehicle 70. To gain unauthorized access to the vehicle 70, an unauthorized person 76, for example, a thief, positions him/herself in an immediate vicinity of the vehicle 70, a transceiver device 82 intercepts radio signals from the vehicle 70, and relays them to another unauthorized person 78 who is situated near the authorized person 74. Signals transmitted by the key 72 are also transmitted from a transceiver unit 80 of the other unauthorized person 78 to a corresponding transceiver device 82 of the first unauthorized person 76, who transmits this radio signal onwards to the vehicle 70.

Thus, the car thieves 76 and 78 have radio relays 82 and 80 which mutually relay the signals from the vehicle 70 and the key 72. The thief is therefore able to open and start the car after the owner 74 having the key 72 has departed.

Figure 2:
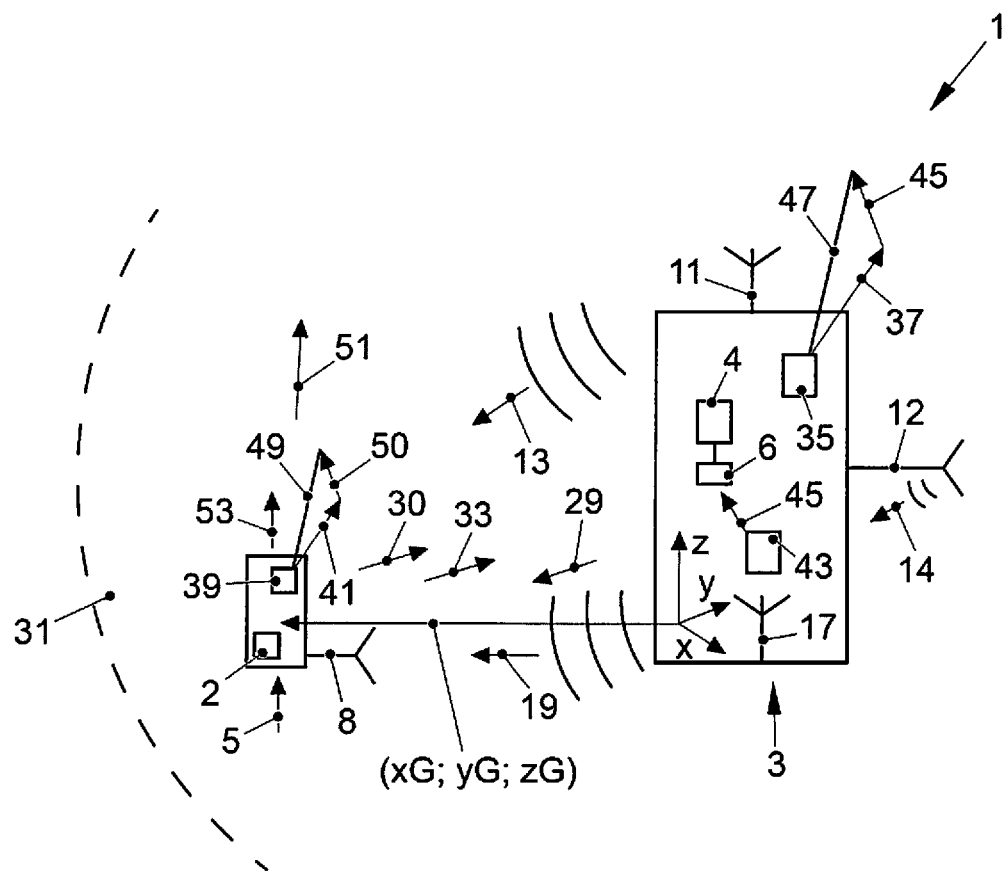
FIG. 2 illustrates a schematic representation of a system for allowing or denying access to a vehicle according to a disclosed embodiment.

FIG. 2 schematically illustrates a system 1 for allowing or denying access to a vehicle 3 according to at least one disclosed embodiment. The system 1 comprises the vehicle 3 and a device 5 which, for example, may comprise an electronic key for gaining access (for example, opening a door and/or starting an engine and/or operating the vehicle for driving) to the vehicle 3, for example, by opening a side door of the vehicle 3.

Figure 3:
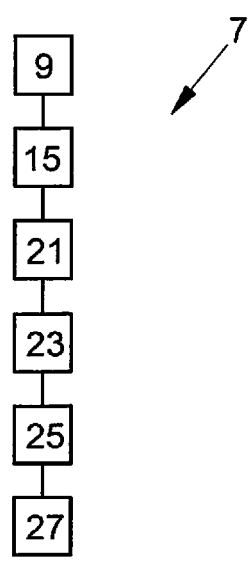
FIG. 3 illustrates a flow chart of a method for assessing a reliability of a determination of the relative position between a device for accessing a vehicle and the vehicle according to a disclosed embodiment.

The system 1 is configured to carry out a method for allowing and denying access to a vehicle according to at least one disclosed embodiment. This method also comprises carrying out a method 7 for assessing a reliability of a determination of the relative position between the device 5 and the vehicle 3 according to at least one disclosed embodiment, the method 7 being depicted in FIG. 3 as a flow chart. In a method operation at 9, a first radio signal 13 (for example, a LF or HF or UHF signal) is transmitted from a first antenna 11 of the vehicle 3, having a known original first signal intensity. In method operation at 15, a second radio signal 19 (for example, a LF or HF or UHF signal) is transmitted from a second antenna 17 of the vehicle 3, having a known second original signal intensity. In a method operation at 21, the device 5 receives the first radio signal 13 and determines a first signal intensity. In an additional method operation at 23, the device 5 receives the second radio signal 19 and determines a second signal intensity, i.e., the intensity of the second radio signal 19 received at the device 5. In a method operation at 25, a relative position (xG, yG, zG) (for example, with respect to a vehicle coordinate system having coordinate axes x, y, z) of the device 5 and the vehicle 3, as well as signal directions (i.e., the directions from which the radio signals 13 and 19 have been received at the device 5), is determined at the device 5 or the vehicle 3, based at least on the first signal intensity and the second signal intensity. In a further method operation at 27, a compatibility of the determined relative position (xG, yG, zG) and the signal directions 13, 19 with an arrangement of the antennas 11 and 17 on the vehicle is determined at the device 5 or at the vehicle 3, to assess the reliability of the relative position determination. It may be detected whether all received radio signals come from the same direction. In such a case, there is a high probability that a relay attack may be taking place (as a function of the antenna positions, if not all antennas are in the same direction in the calculated position).

In this case, the method 7 may be carried out within a method for allowing or denying access to a vehicle 3, wherein here, after determining the degree of reliability, access to the vehicle 3 is allowed or denied. If, for example, a high degree of reliability of the determined relative position (xG, yG, zG) has been determined, a door of the vehicle 3 may be opened according to, or with the aid of, additional signal exchanges between the vehicle 3 and the device, 5 according to one conventional keyless entry method.

If, for example, a high reliability of the determined relative position has been determined, and the device 5 is situated within a predetermined radius around the vehicle 3, the vehicle may transmit an encoded query signal 29, for example, at an LF frequency. Thereupon, the vehicle 3 or a transceiver system 4 comprised therein, which is connected to the first antenna 11, the second antenna 17, and also to a third antenna 12, may switch to a receive mode, for example, in the UHF range (for example, 433 MHz in Europe, or 868 MHz or 315 MHz in Japan or in the USA) and wait for a confirmation from the device 5. If the device 5 (which may be configured as an RFID transponder) is situated within an area 31 which constitutes an acceptable vicinity of the vehicle 3, the device 5 receives the encoded signal 29 from the vehicle 3. The device 5 may then decode the signal 29 and retransmit it, having new encoding, as a signal 33 (for example, in the UHF frequency range). The vehicle 3 receives the signal 33 transmitted by the device 5 via one (or a plurality) of the antennas 11, 12, 17 and decodes it. Since the keyless-go control unit 6 which is included in the vehicle 3 knows both encoding tables, it may compare its own original transmission with the signal 33 just received. If there is no response within a defined period, the system 1 may again switch to a standby mode. If the transmitted signal 33 decoded by the device 5 matches the signal 29 transmitted by the vehicle 3, access to the vehicle 3 may be granted.

Since, according to at least one disclosed embodiment, a degree of reliability of the relative position determination of the device 5 is considered when allowing or denying access to the vehicle 3, the risk of a relay attack as depicted in FIG. 1 may be reduced.

The vehicle 3 may be equipped with a magnetic field sensor 35, which allows determining the terrestrial magnetic field, such as the direction of the terrestrial magnetic field 37. The device 5, which is equipped with a transceiver system 2, may also comprise a magnetic field detection system 39, also to be able to determine a terrestrial magnetic field direction 41 at the device 5. The method carried out by the system 1 may furthermore comprise a comparison of the terrestrial magnetic field direction 37 at the vehicle 3 and the terrestrial magnetic field direction 41 at the device, to further assess the reliability of the relative position determination.

Information ascertained at the device about signal intensities of the signals 19, 33, and about signal directions, and/or about the terrestrial magnetic field, etc., may be transmitted to the vehicle via signals 30.

The vehicle 3 may furthermore comprise an electric machine 43, for instance, an electric motor, for example, a drive motor or an alternator or the like, which is able to generate an additional magnetic field 45 at the vehicle 3 to obtain a total magnetic field 47. The total magnetic field 47 may be obtained as a superimposition of the terrestrial magnetic field 37 and the additional magnetic field 45, and may also be measured by the sensor 35. The total magnetic field 49 and/or its change 50 may furthermore be measured at the device 5. The total magnetic field 49 measured at the device may then be compared to an expected total magnetic field 51 which is derived from the additionally generated magnetic field 45, the determined relative position, and/or a relative orientation, to continue to assess the reliability of the determination of the relative position and/or a determined relative orientation between the device and the vehicle.

For receiving the first signal 13 and the second radio signal 19 and optionally additional radio signals from the vehicle 3, the device comprises an antenna 8 which, for example, may be configured as a 3D antenna, to be able to determine the direction from which the determined radio signals arrive. An orientation 53 of the device 5, which, for example, may represent the direction of a longitudinal axis of the device, may be determined from the determined directions.

The processing of the data for the determination of the relative position and/or an orientation of the device may be carried out in the vehicle 3, for instance, in the control unit 6, for which purpose corresponding data about signal(s) 30 may be transmitted from the device 5 to the vehicle 3.

Disclosed embodiments enable an evaluation and plausibility check of the local terrestrial magnetic field in relation to the direction of reception of the radio signals between the key and the vehicle. For example, the following method operations may be carried out:

1. The vehicle 3 transmits a query 13, 19 to the radio key 5. Here, multiple antennas 11, 12 and/or 17 are used at least for a portion of the radio combination.
2. The radio key 5 receives the query 13, 19 from the vehicle and, upon receiving the signals of the various antennas, ascertains data which, in the case of a known antenna configuration, allow making an inference about the position of the key 5 (for example, field strength measurement, etc.).
3. Both the vehicle 3 and the key measure the local terrestrial magnetic field (37, 41) and relate it to the antennas 11, 12, 17 installed in the vehicle, and to the ascertained position and orientation of the key 5.
4. The position and orientation of the key 5 are plausibility-checked against the measured magnetic field.

It may thus be checked whether the key 5 is actually situated in the vicinity of the vehicle 3 or whether the position is consistently determined, also considering the measurement of the reception directions.

Thus, it may be assumed that the local terrestrial magnetic field generally changes only slightly in the immediate vicinity of the vehicle. Possible sources of interference (for example, steel beams in buildings) may affect the magnetic field, but act equally on the vehicle and the key, so that the magnetic field may still be used for this measure.

According to at least one disclosed embodiment, the device 5 may ascertain the local magnetic field 41 in all three spatial axes, and transmit it to the vehicle 3 along with the ascertained reception strengths and directions of the radio signals 13 and 19. The vehicle 3 may thus be enabled to check whether the magnetic field of the key matches its own magnetic field 37 (and/or 47), considering the position of the key ascertained from the reception strengths and directions. In this case, the transmission of data between the device and the vehicle 3 using conventional measures may be secured, for example, via encryption, signing, etc.

According to an enhancement of the method, during the communication, the vehicle may selectively influence the local terrestrial magnetic field, and it may subsequently be validated whether the key actually detects the influence, as expected. If the key 5 detects the influence, it may be determined whether the change is plausible in relation to the measured distance and direction. In this case, the influence of the magnetic field may take place by briefly switching on electrical devices in the vehicle, for example, the radio, loudspeakers, etc. or electromagnets specifically installed for this purpose. In addition, in the case of electric vehicles, the magnetic field may also be influenced by selectively supplying current to the electric motor (for instance, via direct current, i.e., static current), the brakes, and/or the coil for inductive charging.

In addition, the device 5 may carry out a measurement of the gravitation to ascertain its orientation in space, and also to be able to factor in the gravitation when validating the magnetic field.

Furthermore, in addition to the direction of the magnetic field with respect to the position of the key, it is also conceivable to perform a plausibility check of the direction of motion of the key. For example, if the key is moving away from the vehicle, unlocking is not permissible.

The evaluation and plausibility check of the magnetic field within the scope of the measure may also take place in the key (instead of the vehicle), independently of the above-described enhancements.

The measure may also be applied to other devices used for access, independently of the disclosed embodiment, for example, smartphones and smartwatches, to protect them from relay attacks. This may possibly even be carried out in the devices without additional hardware expense, since in any case, they could have already been equipped with sensors for detecting the magnetic field (and gravitation).

The evaluation of the measured data may possibly be complex and may for this purpose take place in the vehicle or in a processor of the vehicle. If the processing is carried out in the vehicle 3, calculating power may be saved at the device 5, and the hardware may be designed in a simple manner. Furthermore, energy consumption may be reduced. The plausibility check of the measured magnetic field may take place inside the vehicle 3. The key 5 may transmit the detected measurement data to the vehicle for this purpose. If a plausibility check takes place in the key, and if the key transmits only an "acknowledge" to the vehicle, the transmission is possibly significantly easier to bypass, even when using suitable security measures, and the signal could correspondingly be changed within the scope of a relay attack in such a way that a positive response arrives at the vehicle even if the magnetic fields do not match.

The plausibility check of the measure magnetic field may furthermore require specific information about the positions of the antennas 11, 12 and 17 in the vehicle 3, the field characteristic due to the influence of the vehicle shell, and about the antenna parameters used (for example, current supply). If a plausibility check were to take place in the key, these data would have to be correspondingly stored in the algorithm in the key. This may lead to side effects:

The cumulation must possibly include more data (transmission of the information for each plausibility check).

The training of a key must possibly be expanded to include the corresponding data (one-time transmission of the information and subsequent storage in the key). Alternatively, the key must obtain the required information during production. As a result, subsequent changes (for example, software updates of the vehicle) may no longer be possible under some circumstances, or it may no longer be possible for a structurally identical key to be provided under some circumstances for multiple vehicle types, since the parameters differ too much.

The detection of a selected peak in the magnetic field according to at least one disclosed embodiment, caused by a corresponding device in the vehicle, allows only inferences to be made about a geographical proximity and possibly about an approximate distance (evaluation of the signal strength of the measured peak), but not plausibility checking with respect to a position. Therefore, this disclosed embodiment may be viewed as support for other embodiments.

The generation of an additional magnetic field described in this embodiment could, however, also be applied as a sole measure. In this case, a plausibility check of the local terrestrial magnetic field with respect to the key position would be omitted; instead, only the simultaneous presence of a transient change in the magnetic field would be interpreted as an indication of the geographical proximity of the key and vehicle. Although this would considerably simplify the detection and processing, the security of the measure would also decrease, since a magnetic pulse could also be "relayed" using corresponding technology. "Relaying" a magnetic field is possibly only with great effort; therefore, disclosed embodiments may enable access only to persons who are actually authorized.

Disclosed embodiments may be transmitted to conventional radio keys, to protect them from manipulation in which the signal of the radio remote control is recorded and later transmitted.

LIST OF REFERENCE NUMERALS

1 System
3 Vehicle
2 Transceiver device
4 Transceiver device
5 Device
6 Keyless entry control system
7 Method
9, 15, 21, 23, 25, 27 Method operations
8 Antenna of the device
11, 12, 17 Antennas of the vehicle
13 First signal
19 Second signal
29 Encoded signal
30 Signal from device
31 Radius around vehicle
33 Signal encoded by the device
35, 39 Magnetic field detection devices
37 Terrestrial magnetic field at vehicle
41 Terrestrial magnetic field at device
43 Electric machine
45 Additional magnetic field
47 Total magnetic field at the vehicle
49 Total magnetic field at the device
51 Expected total magnetic field at device
53 Orientation of the device
xG, yG, Zg Relative position of the device

The invention claimed is:

1. A method for assessing, at a transportation vehicle, a reliability of a determination of the relative position of the transportation vehicle with respect to a device for accessing the transportation vehicle, the method comprising:
   transmitting a first radio signal from a first antenna of the transportation vehicle;
   transmitting a second radio signal from a second antenna of the transportation vehicle;
   receiving a first signal intensity from the device, the first signal intensity being the signal intensity of the first radio signal at the device;
   receiving a second radio signal intensity from the device, the second signal intensity being the signal intensity of the second radio signal at the device;
   determining a relative position of the device and the transportation vehicle relative to each other based on the received first signal intensity and the received second signal intensity;
   comparing the determined relative position of the device and the transportation vehicle relative to each other with an arrangement of the first antenna and the second antenna at the transportation vehicle, to assess reliability of the determined relative position of the device and the transportation vehicle relative to each other;
   measuring a magnetic field direction at the transportation vehicle;
   receiving from the device a magnetic field direction at the device; and
   comparing the measured magnetic field direction at the transportation vehicle and the received magnetic field direction at the device to further assess the reliability of the determined relative position of the device and the transportation vehicle relative to each other.

2. The method of claim 1, wherein the measured magnetic field direction at the transportation vehicle and the received magnetic field direction at the device are terrestrial magnetic field directions; and
   wherein comparing comprises comparing the terrestrial magnetic field directions with an arrangement of at least the first antenna and the second antenna to further determine the reliability of the determined relative position of the device and the transportation vehicle relative to each other.

3. The method of claim 2, further comprising:
   generating an additional magnetic field at the transportation vehicle, wherein a total magnetic field is a sum of the generated additional magnetic field and a terrestrial magnetic field;
   receiving from the device a total magnetic field at the device; and
   comparing the received total magnetic field at the device to an expected total magnetic field at the device determined based on the additional magnetic field generated at the transportation vehicle, based on the determined relative position to continue to assess the reliability of the determination of the relative position between the device and the transportation vehicle.

4. A transportation vehicle comprising:
   an arrangement of a first antenna and a second antenna;
   a controller communicatively coupled to the first antenna and the second antenna, wherein the controller determines a reliability of a determination of the relative position of the transportation vehicle with respect to a device for accessing the transportation vehicle; and
   a magnetic field detection system to measure a magnetic field;
   wherein the reliability determination comprises:
      transmitting, under the control of the controller, a first radio signal from the first antenna;
      transmitting, under the control of the controller, a second radio signal from the second antenna;
      receiving, via at least one of the first antenna and the second antenna, a first signal intensity from the device, the first signal intensity being the signal intensity of the first radio signal at the device;
      receiving, via at least one of the first antenna and the second antenna, a second radio signal intensity from the device, the second signal intensity being the signal intensity of the second radio signal at the device;
      determining, under the control of the controller, a relative position of the device and the transportation vehicle relative to each other based on the received first signal intensity and the received second signal intensity;
      comparing, under control of the controller, the determined relative position of the device and the transportation vehicle relative to each other with the arrangement of the first antenna and the second antenna, to assess reliability of the determined relative position of the device and the transportation vehicle relative to each other;
      measuring, by the magnetic field detection system, a magnetic field direction at the transportation vehicle;
      receiving from the device, via at least one of the first antenna and the second antenna, a magnetic field direction at the device; and
      comparing, under control of the controller, the measured magnetic field direction at the transportation vehicle and received magnetic field direction at the device to further assess the reliability of the determined relative position of the device and the transportation vehicle relative to each other.

5. The transportation vehicle of claim 4, wherein the measured magnetic field direction at the transportation vehicle and the received magnetic field direction at the device are terrestrial magnetic field directions; and
   wherein controller is configured to control comparing the terrestrial magnetic field directions with the arrangement of the first antenna and the second antenna to further determine the reliability of the determined relative position of the device and the transportation vehicle relative to each other.

6. The transportation vehicle of claim 5, further comprising an electric machine which generates an additional magnetic field at the transportation vehicle, wherein a total magnetic field is a sum of the generated additional magnetic field and a terrestrial magnetic field; and wherein the reliability determination further comprises:
   receiving from the device, via at least one of the first antenna and the second antenna, a measured total magnetic field at the device; and
   comparing, under control of the controller, the received measured total magnetic field at the device to an expected total magnetic field at the device determined based on the additional magnetic field generated at the transportation vehicle, based on the determined relative position to continue to assess the reliability of the determination of the relative position between the device and the transportation vehicle.

7. A method for assessing, at a device for accessing a transportation vehicle, a reliability of a determination of the relative position of the device with respect to the transportation vehicle, the method comprising:
receiving a first radio signal from a first antenna of the transportation vehicle;
receiving a second radio signal from a second antenna of the transportation vehicle;
receiving from the transportation vehicle information about an arrangement of the first antenna and the second antenna at the transportation vehicle;
determining a first signal intensity of the received first radio signal at the device;
determining a second signal intensity of the received second radio signal at the device;
determining a relative position of the device and the transportation vehicle relative to each other and/or signal directions from which the first and second radio signals have arrived at the device, based on the determined first signal intensity and the determined second signal intensity;
comparing the determined relative position of the device and the transportation vehicle relative to each other and/or the signal directions from which the first and second radio signals arrived at the device with the information about the arrangement of the first antenna and the second antenna at the transportation vehicle, to assess reliability of the determined relative position of the device and the transportation vehicle relative to each other;
measuring a magnetic field direction at the device;
receiving from the transportation vehicle a measured magnetic field direction at the transportation vehicle; and
comparing the received magnetic field direction at the transportation vehicle and the measured magnetic field direction at the device to further assess the reliability of the determined relative position of the device and the transportation vehicle relative to each other.

8. The method of claim 7, wherein the device comprises an antenna having at least two antenna sections oriented along two directions, wherein the antenna determines the signal strength components of received signals associated with two directions.

9. The method of claim 7, wherein the magnetic field direction measured at the device and the magnetic field direction at the device received from the transportation vehicle are terrestrial magnetic field directions; and
wherein comparing comprises comparing the terrestrial magnetic field directions with the received information regarding the arrangement of at least the first antenna and the second antenna at the transportation vehicle to further determine the reliability of the determined relative position of the device and the transportation vehicle relative to each other.

10. The method of claim 7, wherein the device is a user-wearable device and/or comprises an electronic key of the transportation vehicle.

11. A device for accessing a transportation vehicle, the device comprising:
an antenna configured to transmit and receive radio signals;
a controller communicatively coupled to the antenna, wherein the controller determines a reliability of a determination of the relative position of the device with respect to the transportation vehicle; and
a magnetic field detection system configured to measure a magnetic field;
wherein the reliability determination comprises:
receiving, via the antenna, a first radio signal from a first antenna of the transportation vehicle;
receiving, via the antenna, a second radio signal from a second antenna of the transportation vehicle;
receiving, via the antenna from the transportation vehicle, information about an arrangement of the first antenna and the second antenna at the transportation vehicle;
determining, under control of the controller, a first signal intensity of the received first radio signal at the device;
determining, under control of the controller, a second signal intensity of the received second radio signal at the device;
determining, under control of the controller, a relative position of the device and the transportation vehicle relative to each other and/or signal directions from which the first and second radio signals have arrived at the device, based on the determined first signal intensity and the determined second signal intensity;
comparing, under control of the controller, the determined relative position of the device and the transportation vehicle relative to each other and/or the signal directions from which the first and second radio signals arrived at the device with the information about the arrangement of the first antenna and the second antenna at the transportation vehicle, to assess reliability of the determined relative position of the device and the transportation vehicle relative to each other;
measuring, by the magnetic field detection system, a magnetic field direction at the device;
receiving, via the antenna from the transportation vehicle, a measured magnetic field direction at the transportation vehicle; and
comparing, under control of the controller, the received magnetic field direction at the transportation vehicle and the measured magnetic field direction at the device to further assess the reliability of the determined relative position of the device and the transportation vehicle relative to each other.

12. The device of claim 11, wherein the antenna has at least two antenna sections oriented along two directions, and wherein the device is configured to determine the signal strength components of received signals associated with two directions.

13. The device of claim 11, wherein the measured magnetic field direction at the device and the magnetic field direction at the transportation vehicle received from the transportation vehicle are terrestrial magnetic field directions; and
wherein comparing comprises comparing the terrestrial magnetic field directions with the received information regarding the arrangement of at least the first antenna and the second antenna at the transportation vehicle to further determine the reliability of the determined relative position of the device and the transportation vehicle relative to each other.

14. The device of claim 11, wherein the device is a user-wearable device and/or comprises an electronic key of the transportation vehicle.

* * * * *